United States Patent
Cancel Olmo et al.

(10) Patent No.: US 9,720,496 B2
(45) Date of Patent: Aug. 1, 2017

(54) TECHNIQUES FOR STABILIZING A DISPLAY SCENE OUTPUT

(71) Applicant: INTEL CORPORATION, Santa Clara, CA (US)

(72) Inventors: Ramon Cancel Olmo, Hillsboro, OR (US); Kunjal Parikh, San Jose, CA (US); Rajashree Baskaran, Seattle, WA (US); Daniel Zhang, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 151 days.

(21) Appl. No.: 14/220,744

(22) Filed: Mar. 20, 2014

(65) Prior Publication Data
US 2015/0271408 A1   Sep. 24, 2015

(51) Int. Cl.
*H04N 5/232* (2006.01)
*G06F 3/01* (2006.01)
*G06F 1/16* (2006.01)

(52) U.S. Cl.
CPC ............ *G06F 3/013* (2013.01); *G06F 1/1626* (2013.01); *G06F 1/1686* (2013.01); *G06F 1/1694* (2013.01); *H04N 5/23219* (2013.01); *H04N 5/23293* (2013.01); *G06F 2200/1637* (2013.01)

(58) Field of Classification Search
CPC ........... H04N 5/23248; H04N 5/23219; H04N 5/23293; G06F 3/013; G06F 1/1626; G06F 1/1686; G06F 1/1694; G06F 2200/1637
See application file for complete search history.

(56) References Cited

U.S. PATENT DOCUMENTS

| | | | |
|---|---|---|---|
| 8,970,495 B1 * | 3/2015 | Biffle ..................... | G09G 3/003 345/158 |
| 2008/0036875 A1 * | 2/2008 | Jones .................. | H04N 5/23238 348/222.1 |
| 2011/0194612 A1 * | 8/2011 | Tsai ....................... | H04N 19/59 375/240.16 |
| 2012/0320500 A1 * | 12/2012 | Lee ......................... | G06F 3/147 361/679.01 |
| 2014/0368508 A1 * | 12/2014 | Kunchakarra .......... | G09G 5/30 345/428 |

* cited by examiner

*Primary Examiner* — Luong T Nguyen

(57) ABSTRACT

Various embodiments are generally directed to an apparatus and method for determining when an eye is focused on a display scene and determining movement of the eye based on image information when the eye is focused on the display scene. Various embodiments may also include detecting motion of an apparatus based on motion information and adjusting at least one of a position and a size of a frame in the display scene based on at least one of the movement of the eye and the motion of the apparatus.

17 Claims, 15 Drawing Sheets

*100*

TECHNIQUES FOR STABILIZING A DISPLAY SCENE OUTPUT

BACKGROUND

Computing devices including mobile devices, portable devices, etc. that can display various textual and graphical information including, images, text, and video playback are becoming extremely popular. For example, many users may enjoy using the computing device to show home movies to their friends, play streaming videos from the interact or watch other videos downloaded directly to their computing device. However, these computing devices generally have a small screen size and a limited battery life.

In spite of those and other inherent limitations, users typically demand that such computing devices be capable of displaying content in high a quality form and without compromising battery life. Thus, shaky or jerky output caused by motion of the computing device or user is generally undesirable when a user is viewing information or a display scene.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
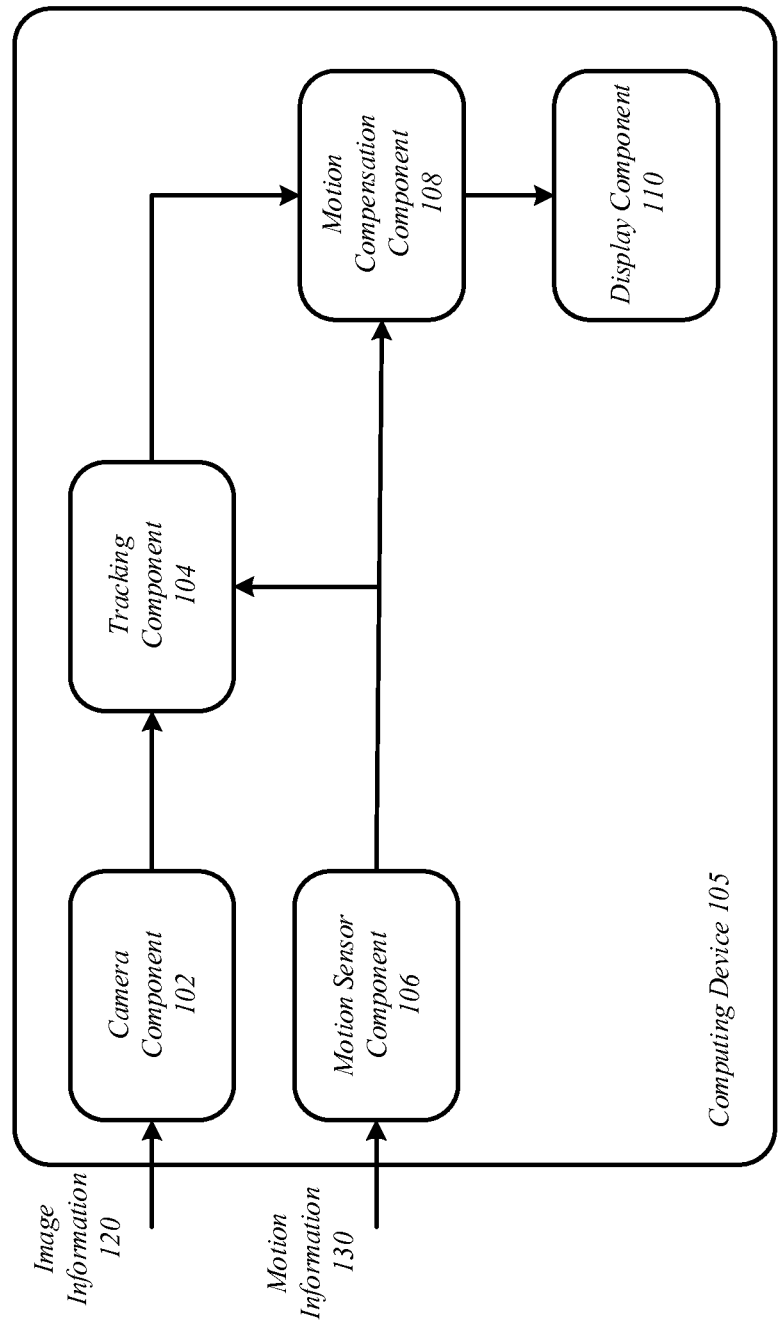
FIG. 1 illustrates an exemplary embodiment of a computing system.

Various embodiments are generally directed to making frame adjustments for an output of a display scene on a display device to compensate for motion of the computing device, a user of the computing device, a user's features, or combination thereof. Motion of the computing device, user, etc. may be caused by any number reasons. For example, a computing device may be mounted on a windshield of a car and may move due to the movement and bouncing of the car. In another example, a user may move the computing device by holding the device and moving his or her arm. In another example, the computing device may be fixed to an object such as a treadmill, however, the user may be moving on the treadmill. In some embodiments, both the computing device and the user may be moving. For example, a user may be walking down the street holding the computing device moving his or her arm.

In all these examples, the output may appear shaky, jerky and unwatchable due to the motion of the computing device, a user, a user's eyes, and so forth. Thus, various embodiments are directed to adjusting a frame of a display scene of the output to compensate for any of the motions described above. Moreover, the display scene may include any type of output, such as a video output stream, a text output, an image output, a graphical output, a webpage output, and so forth. Various embodiments are not limited in this manner and a display scene may output any type information that may be displayed on a display device.

Further, various techniques described herein are directed to adjusting a position, or a size of the frame of a display scene when presented on a display component of the computing device. The position and the size may be adjusted in any direction and may be based on the detected motion of the computing device, the user, the user's eyes, and so forth. For example, the computing device may include a camera component to detect and capture image information of the movement of the user and the user's eyes. The camera component may capture the image information and send the information to one or more other components of the computing device for further processing. In various embodiments, one or more image stabilization and feature tracking algorithms may be applied to the image information to determine the motion of the user (caused either by motion of the computing device or motion of the user), to determine the focus of the user's eyes and to track the movement of the user's eyes. As will be discussed in more detail below, this image motion information may be used to adjust the position or the size of one or more frames to compensate for the motion. However, processing the image information alone with the image stabilization and feature tracking algorithms may be processing intense and use too much battery power.

Thus, various embodiments may also include a motion sensor component to detect motion of the computing device. For example, the motion sensor component may be an inertial sensor, such as an accelerometer, which may detect motion of the device in any direction. This motion information may be directly used to adjust the position or size of the frame of a display scene. Furthermore, the motion information may be used as a motion estimation and a starting point for the one or more image stabilization and feature tracking algorithms when processing the image information. By using the motion estimation as a starting point, significant power and battery savings may be achieved due to less iterations of processing the image information. Various details will become more apparent by the following description.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

FIG. 1 illustrates a general overview of a computing system 100 including a computing device 105 for adaptively stabilizing output, such as a video output stream on a display device. More specifically, FIG. 1 illustrates computing device 105 including a camera component 102, a tracking component 104, a motion sensor component 106, a motion compensation component 108 and a display component 110. In various embodiments, the camera component 102 may receive or detect image information 120 and the motion sensor component 106 may receive or detect motion information 130. Although FIG. 1 shows a limited number of components, various embodiments may have any number of components for frame stabilization of a video stream output. Further, the various components may be implemented in software, hardware, or combination thereof.

In various embodiments, camera component 102 may include camera circuitry to capture, receive or detect image information, such as image information 120. The camera component 102 may be any type of camera including a still photo camera and/or a video camera capable of capturing the image information. In some embodiments, the camera component 102 may detect a user's face and facial features, such as a user's eyes, nose, mouth, ears, and so forth and the image information may include facial information. The camera component 102 may process the image information including the facial information and may send it to the other components of the computing device 105 for further processing. For example, the image information may be sent from the camera component 102 to the tracking component 104 for further processing.

The tracking component 104 may receive the image information 120 and apply any number of image stabilization algorithms and feature tracking algorithms to the image information to determine the motion of the computing device 102, a user, or both and to track one or features of the user. For example, the tracking component 104 may apply a parametric block matching algorithm, an optical flow estimation algorithm, linear region matching algorithm, a gray-coded bit plane matching algorithm, a point-to-line correspondence algorithm, a feature tracking algorithm, a pyramidal algorithm, a block matching algorithm or any other type of image stabilization or feature tracking algorithm to determine motion and feature track.

In some embodiments, the tracking component 104 may determine motion based only on image information 120 received by the camera component 102. However, in the same or other embodiments, the tracking component 104 may use motion information from the motion sensor component 106 to use as inputs to an image stabilization or feature tracking algorithm to reduce the amount of processing and energy used by the computing system 100 to calculate the motion. More specifically, the motion detected motion component 106 may be used as a motion estimate for an algorithm to start with when processing the image information to determine motion. By using this motion information as a starting point, an algorithm may reduce the number of iterations required to determine the motion of the computing device 105, a user, or both.

In addition to determining the motion of a computing device and/or the user, the tracking component 104 may receive the image information and may apply a feature tracking algorithm to track and determine motion of one or more features of a user, such as a user's eyes. In addition, feature tracking may be used to determine motion of the computing device and the user in any direction. More specifically, the tracking component 104 may detect a shift in a user's eyes indicating that the computing device, the user or both have moved. A shift in the user's eyes may be caused by the user trying to maintain focus on a particular point or object in a frame of a display scene on a display component of the computing device 105. In one example, a shift in the user's eyes in one direction may indicate that the computing device 105 has moved in the opposite direction relative to the user. In this example, either the user or the device may have actually moved and only the relative motion between the user and the device may be determined based on the feature tracking of the user's eyes. Further, a shift in the user's eyes may indicate that both the computing device 105 and the user have moved relative to each other. In this example, the computing device 105 and user may be moved in the same direction or in opposite directions and the detected shift in eyes may reflect both of these motions.

The tracking component 104 may also be capable of determining when the user's eyes are focused on an area of a frame of a display scene or not on the frame of the display scene at all. For example, the tracking component 104 may determine when a user is focused on a particular point in the frame, such as an object or person in the frame or on a particular piece of text in the frame. Moreover, the tracking component 104 may be able to detect when a user is looking at something other than the frame and is not focused on the information on the display component of the computing device 105. The tracking component 104 may communicate image motion information including tracking information to one or more components of computing system 100. The image motion information may be used to determine adjustments to one or more frames and whether a user is focused on a display scene.

In some embodiments, the computing device 105 may include a motion sensor component 106 to determine the motion of the computing device 105. The motion sensor component 106 may be any hardware, software and/or logic to detect motion of the computing device 105. The motion sensor component 106 may be one or more sensors to detect motion of the computing device 105 including an accelerometer, a gyroscope, a mercury switch, a micro-pendulum, an inertial sensor, or any other type of sensor to detect motion.

In various embodiments, the motion sensor component 106 may be used as a standalone component to determine the motion of the computing device 105 or may be used in conjunction with the camera component 102 to determine the motion of computing device 105 and/or a user. The motion sensor component 106 may detect the motion of the computing device 105 in any direction in space and may communicate the motion information to other components, such as the tracking component 104 to use as a motion estimate when processing image information and to the motion compensation component 108 to adjust a frame for presenting to a user on a display component 110.

The computing device 105 may also include a motion compensation component 108 to adjust one or more frames of an output, such as video output stream based on detected motion and feature tracking. More specifically, the motion compensation component 108 may adjust a position and/or size of one or more frames of a display scene within in a display component based on motion of the computing device 105, a user, or both. Further, the one or more frames may be adjusted based on information from only the camera component 102, only the motion sensor component 106, or a combination of both.

The motion compensation component 108 may receive image motion information from the tracking component 104 based on the image information 120 detected by the camera component 102 and the application of an image and feature tracking algorithm(s). The motion sensor compensation component 108 may also receive motion information 130 from the motion sensor component 106. In various embodiments, the image motion information and motion information may indicate the motion of the computing device 105, a user, or both in any direction in three dimensional (3D) space.

The motion compensation component 108 may adjust or stabilize a frame of an output presented to a user based on the image motion information, motion information, or combination thereof. For example, a user may be viewing a video output stream, such as a movie, a television show, streaming content, home video output, and so forth on a display component 110. Motion of the computing device 105 and/or the user may cause the video output stream to appear jerky and visually unappealing. However, one or more frames of the video output stream may be adjusted to compensate for the motion of the computing device, the user, or both. The one or more frames may be adjusted by a change in position within the display component or change in size within the display component, or both.

In various embodiments, the motion compensation component 108 may adjust a position of one or more frames by moving or shifting the frames in an upward direction, a downward direction, a left direction, a right direction, or combination thereof when presenting the frames on the display component. The direction of the adjustment may be based on the direction of the detected motion. More specifically, the motion compensation component 108 may adjust the frames in the opposite direction of the motion of a computing device 105. For example, if the computing system moves in an upward the one or more frames may be moved in a downward direction on the display component 110.

Further, the direction of the adjustment may also be based on a detected motion the user's eyes focused on the display component. In these embodiments, the direction of the adjustment may be in the same direction as the motion of the user's focus on the display component 110. For example, if the user's eyes move in an upward direction, the one or more frames may be adjusted in an upward direction.

In some embodiments, motion of the computing device 105, the user and/or the user's eyes may be detected simultaneously or nearly simultaneously. The motion compensation component 108 may adjust the position of one or more frames based on the relative motion of the computing device 105 and the motion of the user's eyes. For example, the tracking component may determine the user's eyes changing focus in a direction and the motion sensor component may detect the device moving in a direction. When the motion of the computing device 105 and the motion of the user's eyes are in the same direction, the combined relative motion between the computing device 105 and the user's eyes will be less than when only the device or the user's eyes move. For example, if the computing device 105 and the user's eyes both move in the upward direction, the relative motion between the computing device 105 and the user's eye will be less than if only the computing device 105 or the user's eyes moved in the upward direction. In another example, the computing device 105 and the user or user's eyes may move in opposite directions increasing the relative movement between themselves. In this example, the motion compensation component 108 may adjust or shift the frame more than if only the computing device 105 or the user's eye were in motion.

In various embodiments, the computing system, user and user's eye may move in any direction and the motion compensation component 108 may adjust or shift the one or more frames in any direction based on the relative movement of the computing system, user and the user's eyes. In some instances, the relative motion between the computing system and the user or user's eyes may be zero. In this case, the motion compensation component 108 may make no adjustment to the one or more frames of the video output stream.

The motion compensation component 108 may determine the magnitude of the adjustment of position or shift of the one or more frames based on the magnitude of the motion detected of the computing system, the user, the user's eye, or combination thereof. In various embodiments, the magnitude of the adjustment of position may be proportional to the magnitude of the motion detected. For example, in some embodiments, if the magnitude of the motion detected is 10 centimeters (cm), the magnitude of the adjustment of position may be $\frac{1}{10}^{th}$ the magnitude of the motion detected or 1 cm. However, various embodiments are not limited in this manner and the magnitude of adjustment of position may be any factor or proportion of the magnitude of the motion detected.

In some embodiments, adjusting the position of the one or more frames of a display scene on the display component 110 may cause part of the frame to no longer be present on the display component 110. For example, if a frame is moved in an upward direction the top portion of the frame may no longer presented to the user as it is shifted out of the viewing area of the display component 110. Therefore, the motion compensation component 108 may adjust the size of one or more frames to compensate for the motion of the computing device 105, the user, the user's eyes or combination thereof. More specifically, the frame may be compressed in any direction including an upward direction from a bottom edge of the frame, a downward direction from a top edge of the frame, a left direction from a right edge of the frame, a right direction from a left edge of the frame, or combination thereof.

As similarly discussed above with respect to adjusting the position of the one or more frames, the size of the frames may be adjusted in a direction based on the motion of the computing device 105, the user, the user's eyes or combination thereof. In some embodiments, the frame may be compressed or the size of the frame may be adjusted in the same direction of the detected motion of the user's eyes. However, the frame may be compressed or the size of the frame may be adjusted in the opposite direction of the detected motion of the computing device 105. Moreover, the size of the frame may be adjusted based on the relative motion of the computing device 105 and the user's eyes as similarly discussed above with respect to the adjusting the position of the frames.

In various embodiments, the motion compensation component 108 may determine the magnitude of the adjustment of the size or compression of the frames based on the magnitude of the motion detected of the computing system, the user, the user's eye, or combination thereof. In various embodiments, the magnitude of the adjustment of size may be directly proportional to the magnitude of the motion detected. For example, in some embodiments, if the magnitude of the motion detected is 10 centimeters (cm), the magnitude of the adjustment of size may be ⅒th the magnitude of the motion detected or 1 cm. However, various embodiments are not limited in this manner and the magnitude of adjustment of size may be any factor or proportion of the magnitude of the motion detected.

The motion compensation component 108 may send the adjusted frames to a display component 110 and a display controller (not shown) for presenting the frame to the user on the display component 110. In some embodiments, the frames may be sent to the display component 110 at 120 hz or twice as fast as a display's normal refresh rate. By providing the frames at this faster rate, the video stream output stabilization may appear more smoothly to the user of the computing system 100. However various embodiments are not limited in this manner and the frames may be sent to the display component 110 and display controller at any rate.

In some embodiments, the tracking information may indicate that a user's eye are not focused on the display scene, but are focused something else. The motion compensation component 108 may send a black frame to the display component 110 and a display controller to present to the user. By sending the black frame, visual artifacts may be removed from the display component.

In various embodiments, the display component 110 may constitute any display device capable of displaying information received a processing component or a graphics processing unit. The display component 110 may include at least one of a Liquid Crystal Display (LCD), a Thin Film Transistor-LCD (TFT-LCD), an Organic Light Emitting Diode (OLED), a flexible display, a three-dimensional (3D) display, touchscreen and/or touch sensitive display and a projector, for example. The display component 110 may display a display scene of a video output or stream. In some embodiment, a computing device may include two or more display units. The display component 110 may display any information or data associated system 100.

Figure 2:
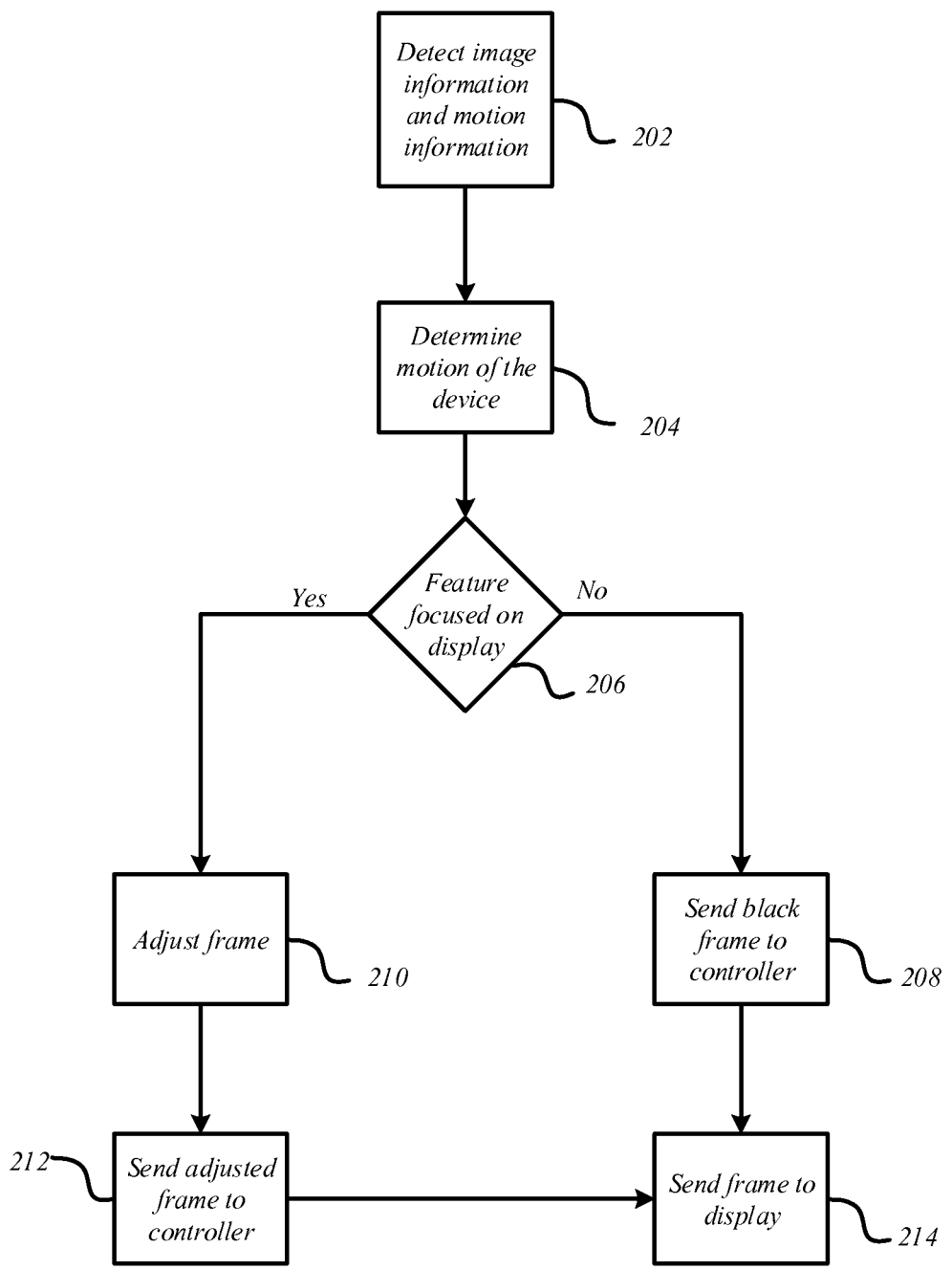
FIG. 2 illustrates an embodiment of a first logic flow diagram for frame stabilization during video output.

FIG. 2 illustrates a first logic flow diagram 200 for frame stabilization during video output. At block 202, image information detected. More specifically, a camera component of a computing device may detect image information of a user, features of a user, other background features, or anything else within the viewing area of the camera component. Further, and at block 204, motion of a computing device may be determined In some embodiments, the image information alone may be used to determine motion of computing device when one or more stabilization and feature tracking algorithms are applied to the image information. However, a motion sensor component may also detect motion of the computing device based on a movement of the device or a user coupled with the device. Further, the motion information may be used as inputs during the image motion calculation when applying the one or more algorithms to detect motion based on the image information. More specifically, the motion information detected by the motion sensor may be used a motion estimate to start the calculations of the image motion information. By using the motion information detected by a motion sensor as a starting point when processing the image information processing power may be reduced and battery life may be saved.

In various embodiments, the logic flow 200 may include determining whether one or more features of a user, such as a user's eyes, are focused on a display scene displayed within display component at decision block 206. For example, the feature tracking component may apply the one or more algorithms to the image information to track user features. In various embodiments, the tracking component may determine whether a user is focused on the display component or if the user is focused on something other than the display component.

If at decision block 206, it is determined that the user and user's features are not focused on the display component, a black frame may be sent to a controller for display at block 208. For example, in some embodiments a feature tracking component may determine that a user's eyes are not focused on the display component and the feature tracking component may send image motion information to a motion compensation component including information indicating that a user's features are not focused on the display component. The motion compensation component may then send a black frame to a display controller based on the information.

If at decisions block 206, it is determined that user and user's features are focused on the display component, an adjustment to a frame may be made at block 210. More specifically, a motion compensation component may receive image motion information based on image information detected by a camera component and motion information detected by a motion sensor component. In some embodiments, the motion compensation component may only receive image motion information or motion information detected by a sensor from their respective components.

The motion compensation component may use the image motion information and the motion information to make one or more adjustments to a frame such as changing a position of the frame within the display component, changing the size of the frame within the display component or both. As previously discussed, when adjusting the position, the frame may be shifted in an upward direction, a downward direction, in a right direction, a left direction or combination thereof based on image motion information and/or motion information. Likewise, the size of the frame may be adjusted in an upward direction from a bottom edge of the frame, in a downward direction from a top edge of the frame, in a right direction from a left edge of the frame, a left direction from a right edge of the frame, or combination thereof At block 212, the logic flow 200 may include sending the adjusted frame to a controller for processing and displaying on a display component. In some embodiments, the adjusted frame or the black frame from block 208 may be sent to the controller at a 120 Hz refresh rate such that the motion compensation for the output is appears smoother to a user.

The logic flow 200 may also include sending the adjusted frame or black from to the display component for presentation to a user at block 214. In various embodiments, logic flow 200 may be repeated any number of times including for each frame of the output. However, in some embodiments, logic flow 200 may only be invoked when motion is detected based on image information, motion information, or both. Although, logic flow 200 is depicted as occurring in a certain order various embodiments, are not limited in this manner and some blocks may occur before other blocks or may be processed in parallel.

FIGS. 3A-3D illustrate exemplary embodiments of a frame adjustment on a computing device 305. In various embodiments, the computing device 305 may include a display component 302 for displaying or presenting a frame 304 to a user. The frame 304 may be one or many frames of a video output stream a user may be viewing on the computing device 305. As previously discussed, the position or the size of the frame 304 may be adjusted to compensate for motion of the computing device 305, a user, a user's features, or combination thereof. More specifically, at least one of a height or a width of the frame may be adjusted when adjusting the size of the frame and the frame may be adjusted in at least one of a horizontal or vertical direction when adjusting the position of the frame.

Figure 3:
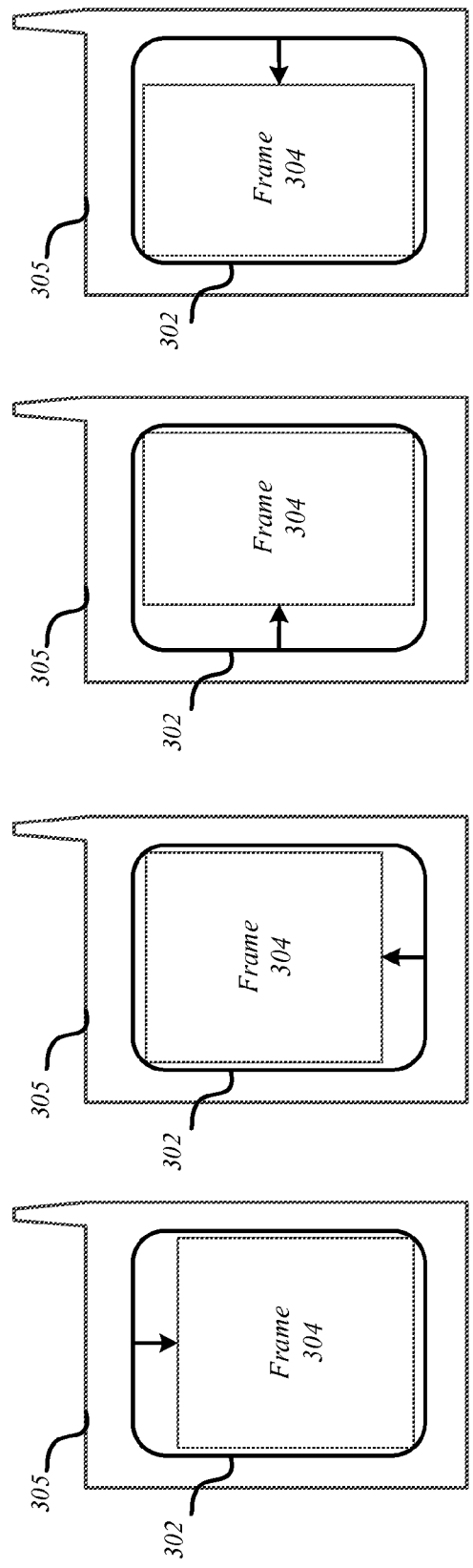
FIGS. 3A-3D illustrate embodiments of a frame adjustment in one direction.

FIG. 3A illustrates the frame 304 adjusted in a downward direction when displayed on the display component 302. The frame 304 may either be shifted in a downward direction cutting off a bottom portion of the frame 304 when displaying or the frame 304 may be compressed in a downward direction from the top edge of the frame 304. By compressing the frame 304 no portion of the frame 304 will be cut off from being displayed on the display component 302.

Figure 4:
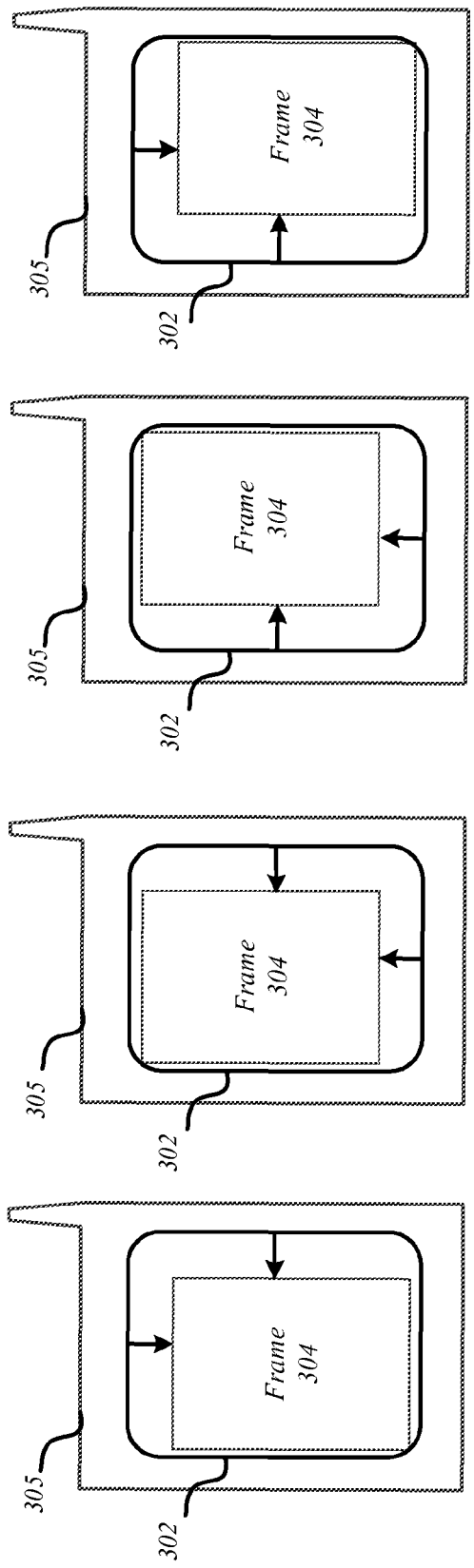
FIGS. 4A-4D illustrate embodiments of a frame adjustment in multiple direction.

Similarly, FIG. 3B illustrates the frame 304 adjusted in an upward direction when presented within the display component 302. Further, FIGS. 3C and 3D illustrate the frame 304 adjusted in a right direction and a left direction, respectively. Again, the frame 304 may be shifted in any direction or compressed in any direction FIGS. 4A-4D illustrate exemplary embodiments of a frame adjustment on a computing device 305 in multiple directions. More specifically, FIG. 4A illustrates the frame 304 adjusted in both downward and left directions, FIG. 4B illustrates the frame 304 adjusted in both upward and left directions, FIG. 4C illustrates the frame 304 adjusted in both upward and right directions and FIG. 4D illustrates the frame 304 adjusted in both downward and right directions. As will be discussed in more detail below, the frame 304 may be adjusted in multiple directions based motion of a computing device, a user, a user's features or combination thereof detected in multiple directions. Further and as previously discussed, the frame 304 may either be shifted or compressed when adjusted within the display component 302.

FIGS. 5A-5D illustrate exemplary embodiments of a frame adjustment based on feature motion. The exemplary embodiments illustrated in FIGS. 5A-5D show movement of an eye 510 in a direction and a frame adjustment based on the detected movement. The frame 304 may be adjusted in the same direction as the detect motion of the eye 510. The adjustment may either be a shift of the frame 304 within the display component 302 or a compression of the frame 304 within the display component 302.

Figure 5:
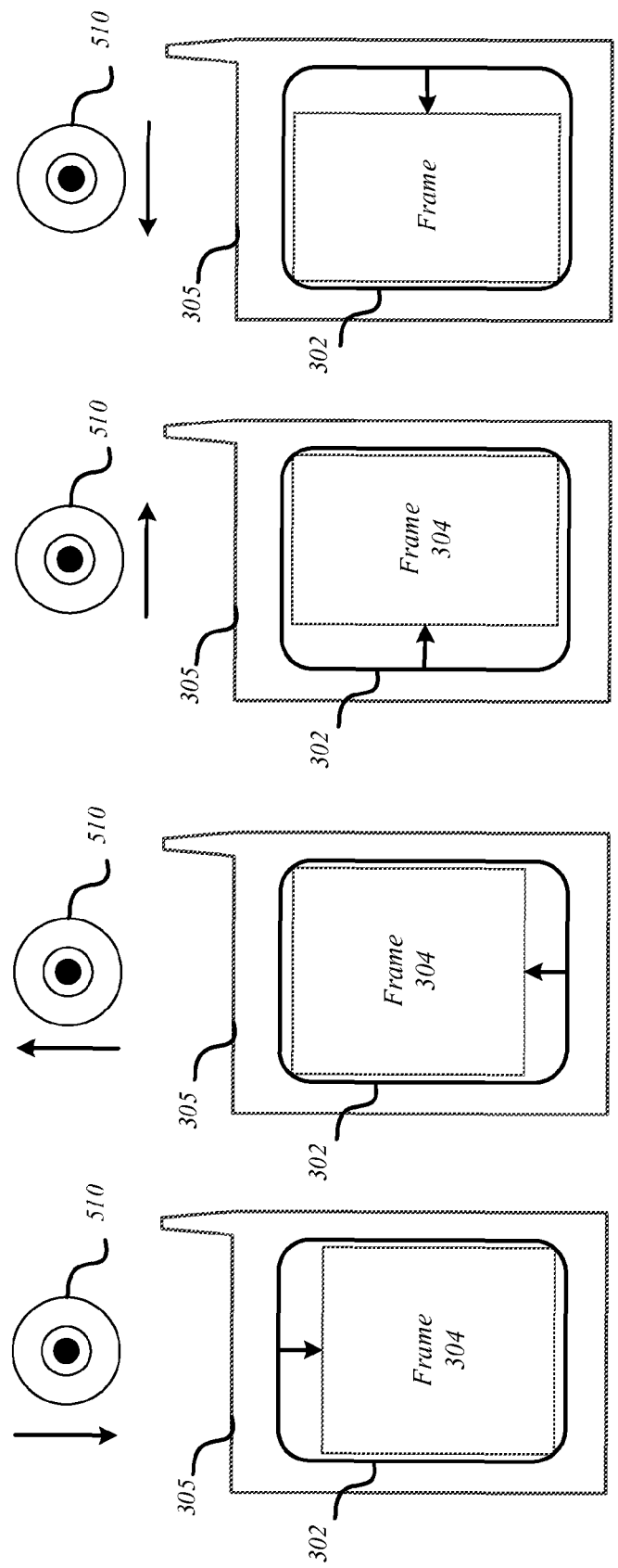
FIGS. 5A-5D illustrate embodiments of a frame adjustment in one direction based on feature motion.

FIG. 5A illustrates the frame 304 adjusted in a downward direction based on a downward movement of a user's eye 510 detected by a camera component. The frame 304 may either be shifted in a downward direction in the display component 302 or compressed from a top edge of the frame 304. FIG. 5B illustrates the frame 304 adjusted in an upward direction based on an upward movement of a user's eye 510 detected by a camera component. The frame 304 may either be shifted in an upward direction in the display component 302 or compressed from a bottom edge of the frame 304. FIG. 5C illustrates the frame 304 adjusted in a right direction based on a right movement of a user's eye 510 detected by a camera component. The frame 304 may either be shifted in a right direction in the display component 302 or compressed from a left edge of the frame 304. FIG. 5D illustrates the frame 304 adjusted in a left direction based on a left movement of a user's eye 510 detected by a camera component. The frame 304 may either be shifted in a left direction in the display component 302 or compressed from a right edge of the frame 304. Various embodiments are not limited to the above examples and the frame may be adjusted in any direction.

FIGS. 6A-6D illustrate exemplary embodiments of a frame adjustment based on feature motion. The exemplary embodiments illustrated in FIGS. 6A-6D show movement of an eye 510 in a direction and a frame adjustment in multiple directions based on the detected movement. The adjustment may either be a shift of the frame 304 within the display component 302 in multiple directions or a compression of the frame 304 within the display component 302 in multiple directions.

FIG. 6A illustrates the frame 304 adjusted in a downward direction and left direction based on the direction of movement of a user's eye 510 detected by a camera component in a downward and left direction. The frame 304 may either be shifted in a downward direction and left direction in the display component 302 or compressed from a top edge and right edge of the frame 304. FIG. 6B illustrates the frame 304 adjusted in an upward direction and left direction based on movement of a user's eye 510 detected by a camera component in an upward and left direction. The frame 304 may either be shifted in an upward direction and left direction in the display component 302 or compressed from a bottom edge and right edge of the frame 304. FIG. 6C illustrates the frame 304 adjusted in a right direction and upward direction based on the movement of a user's eye 510 detected by a camera component right and upward direction. The frame 304 may either be shifted in a right and upward direction in the display component 302 or compressed from a left and bottom edge of the frame 304. FIG. 6D illustrates the frame 304 adjusted in a right and downward direction based on a movement of a user's eye 510 detected by a camera component in a right and downward direction. The frame 304 may either be shifted in a right and downward direction in the display component 302 or compressed from a left and bottom edge of the frame 304.

FIGS. 7A-7D illustrate exemplary embodiments of a frame adjustment based on device motion. The exemplary embodiments illustrated in FIGS. 7A-7D show movement of the device 305 in a direction and a frame adjustment based on the detected movement. The movement of the device 305 may be detected by a motion sensor component, a camera component, or both. The frame 304 may be adjusted in an opposite direction as the detect motion of the device 305. The adjustment may either be a shift of the frame 304 within the display component 302 or a compression of the frame 304 within the display component 302.

Figure 7:
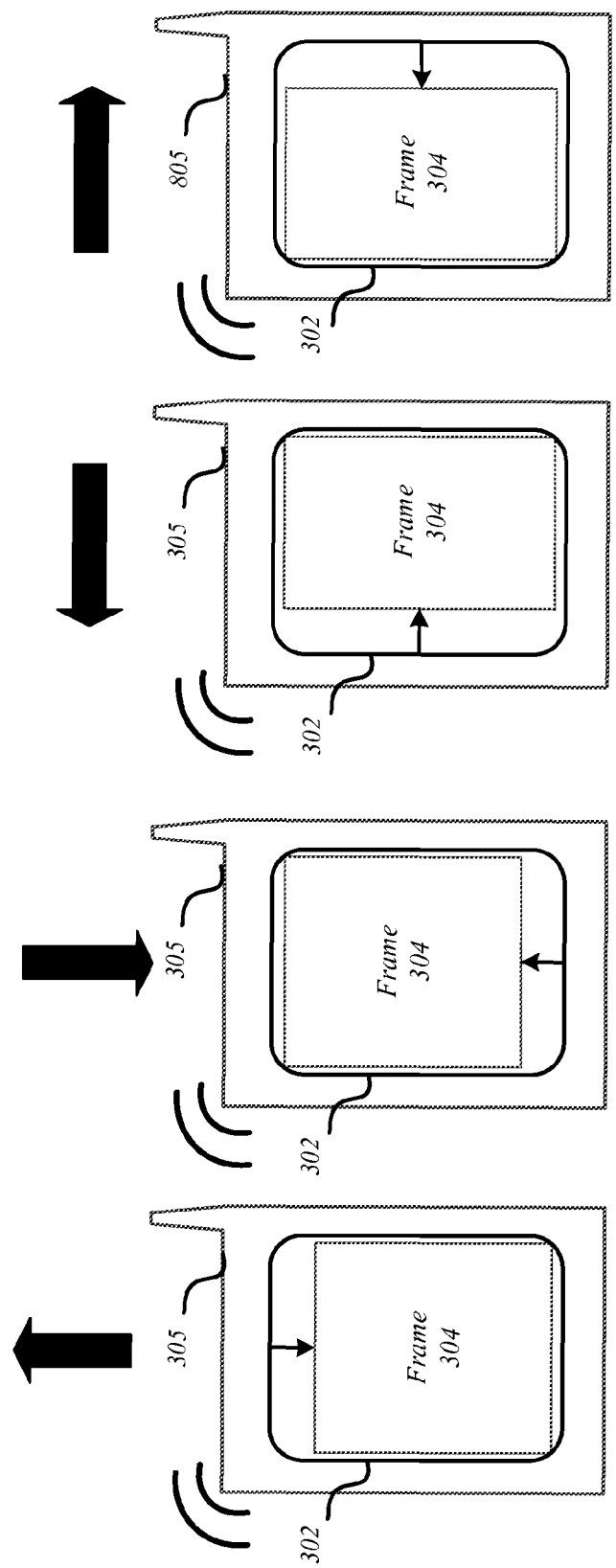
FIGS. 7A-7D illustrate embodiments of a frame adjustment in one direction based on device movement.

FIG. 7A illustrates the frame 304 adjusted in a downward direction based on an upward motion of the device 305. The frame 304 may either be shifted in a downward direction in the display component 302 or compressed from a top edge of the frame 304. FIG. 7B illustrates the frame 304 adjusted in an upward direction based on downward motion of the device 305. The frame 304 may either be shifted in an upward direction in the display component 302 or compressed from a bottom edge of the frame 304. FIG. 7C illustrates the frame 304 adjusted in a right direction based on a left motion of the device 305. The frame 304 may either be shifted in a right direction in the display component 302 or compressed from a left edge of the frame 304. FIG. 7D illustrates the frame 304 adjusted in a left direction based on a right motion of the device 305. The frame 304 may either be shifted in a left direction in the display component 302 or compressed from a right edge of the frame 304.

FIGS. 8A-8D illustrate exemplary embodiments of a frame adjustment in multiple directions based on device motion. The motion of the device 305 may be detected by a motion sensor component, a camera component, or combination thereof. The adjustment may either be a shift of the frame 304 within the display component 302 in multiple directions or a compression of the frame 304 within the display component 302 in multiple directions.

Figure 8:
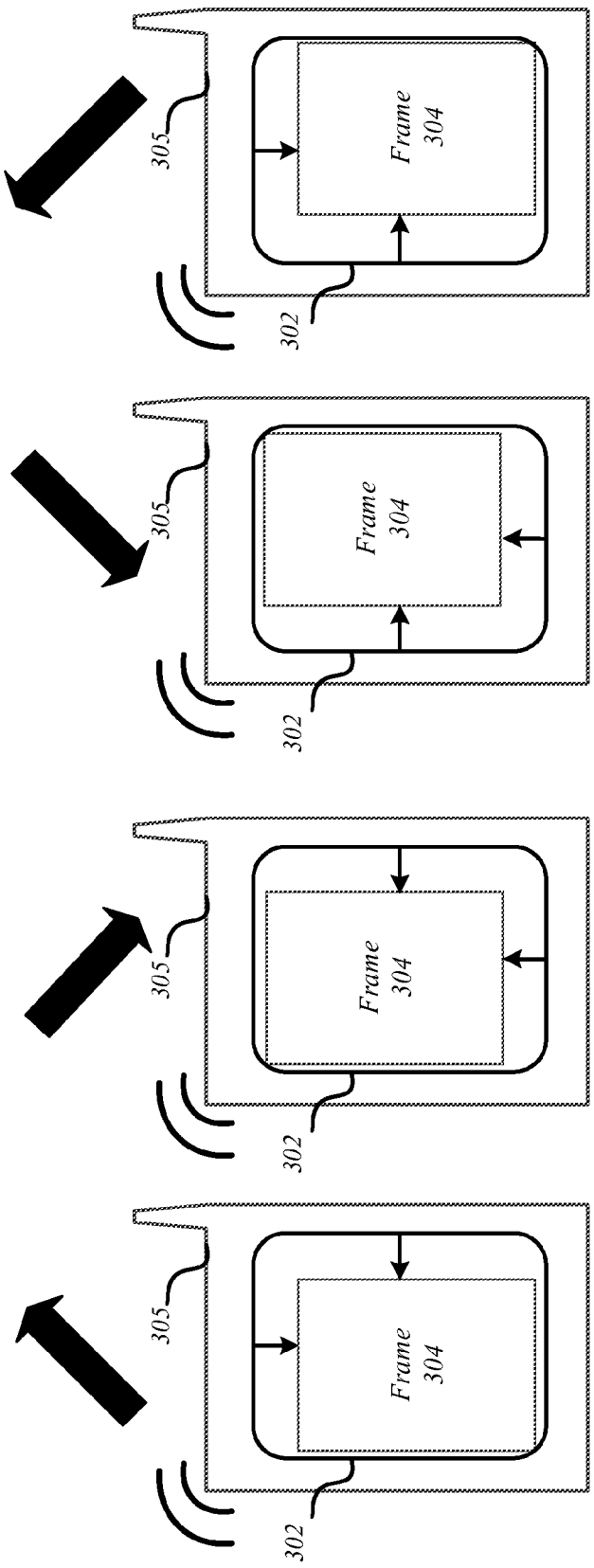
FIGS. 8A-8D illustrate embodiments of a frame adjustment in multiple directions based on device movement.

FIG. 8A illustrates the frame 304 adjusted in a downward direction and left direction based on the motion of the device 305 in an upward and right direction. The frame 304 may either be shifted in a downward direction and left direction in the display component 302 or compressed from a top edge and right edge of the frame 304. FIG. 8B illustrates the frame 304 adjusted in an upward direction and left direction based on motion of the device 305 in a downward and right direction. The frame 304 may either be shifted in an upward direction and left direction in the display component 302 or compressed from a bottom edge and right edge of the frame 304. FIG. 8C illustrates the frame 304 adjusted in a right direction and upward direction based on motion of the device 305 in a downward and left direction. The frame 304 may either be shifted in a right and upward direction in the display component 302 or compressed from a left and bottom edge of the frame 304. FIG. 8D illustrates the frame 304 adjusted in a right and downward direction based on a motion of the device 305 in a left and upward direction. The frame 304 may either be shifted in a right and downward direction in the display component 302 or compressed from a left and top edge of the frame 304.

Figure 9:
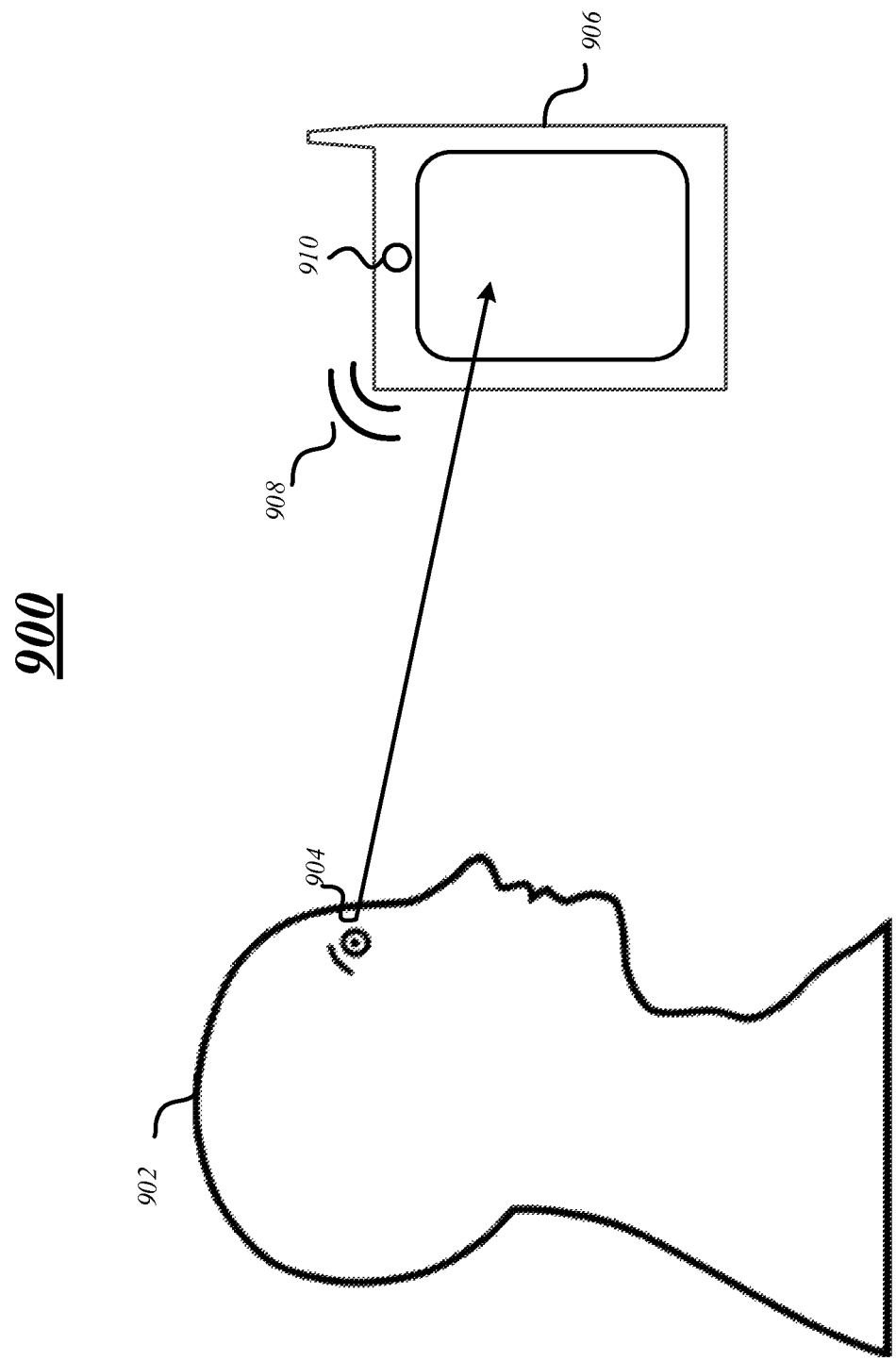
FIG. 9 illustrates an embodiment of a computing device and device motion detection.

FIG. 9 illustrates an embodiment of a computing device 906 and motion detection. In various embodiments, a user 902 may be focused on the computing device 906 and motion 908 may be detected by one or more sensors such as a motion sensor component, as previously discussed above with respect to FIG. 1. FIG. 9 illustrates computing device 906 including a camera component 910 which may be used to detect whether the user 902, and in particular, the user's eyes 904 are focused or not focused on a display component. Further, the camera component 910 may be used to detect motion of the user 902, the user's eyes 904, the computing device 906, or combination thereof. However, in this illustrated embodiment, only motion 908 of the computing device 906 is detected by a motion sensor component.

In response to detecting motion of the computing device 906, frames of a video output stream may be adjusted to compensate for the motion of the device. More specifically, one or more frames may be shifted or compressed on the display component of the computing device 906 when the motion is detected. As previously discussed, the frames may be adjusted in any direction and may be based on the direction of the motion detected. In some embodiments, the adjustment may only be applied to one frame and recalculated for the next frame, may be applied to particular number of frames, or may remain until additional motion is detected. Various embodiments are not limited in this manner.

Figure 10:
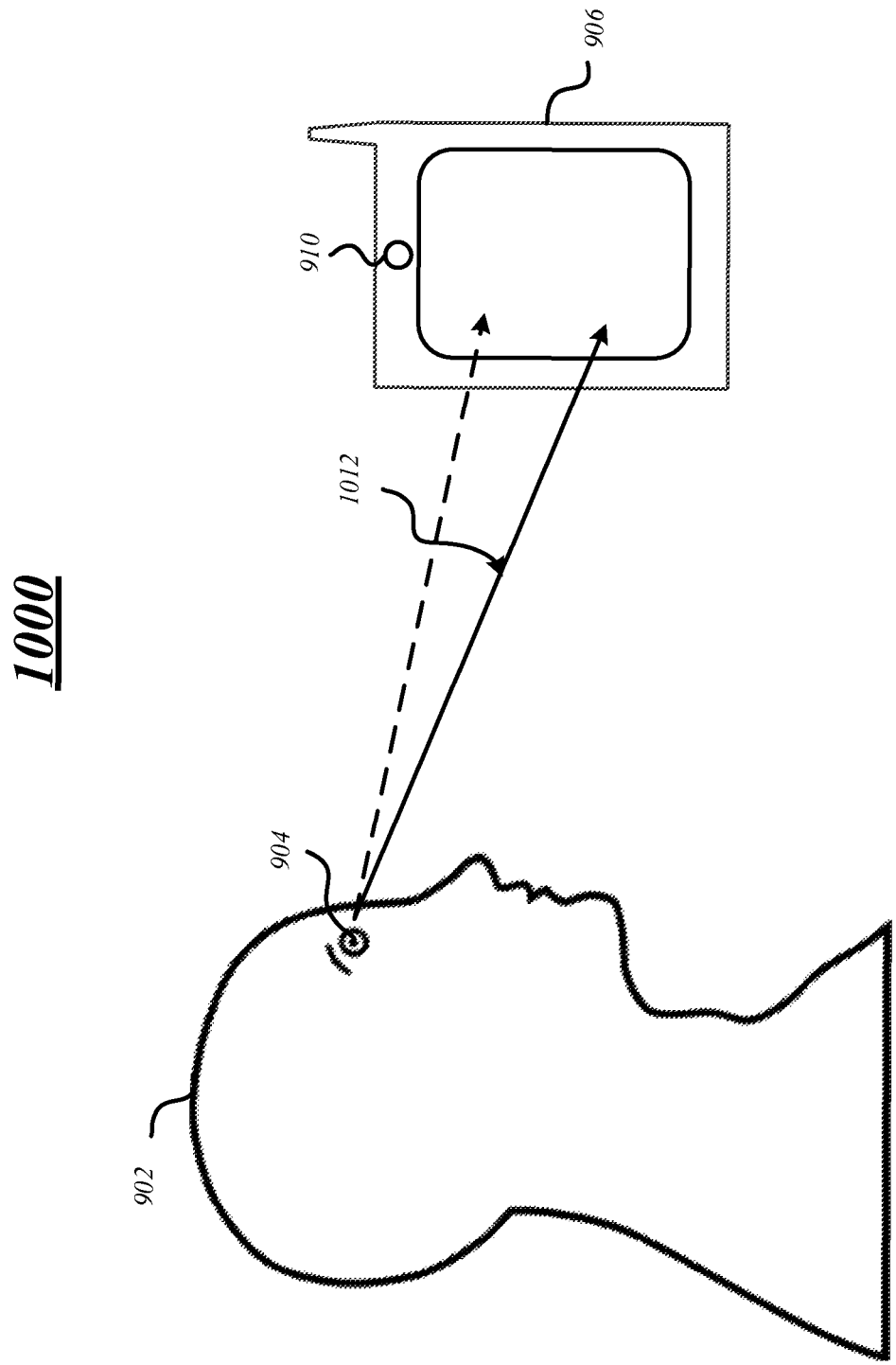
FIG. 10 illustrates an embodiment of a computing device and feature motion detection.

FIG. 10 illustrates an embodiment of a computing device 902 and feature motion detection. In this exemplary embodiment the computing device 902 may include a camera device 910 to detect a user's feature motion 1012. As previously discussed, the camera component 910 may receive image information and apply one or more image stabilization and feature tracking algorithms to the image information to determine user feature motion.

In the illustrated embodiment, the camera component 910 may receive image information indicating that the user's eyes 904 have moved focus on the display component in a downward direction. In some embodiments, a movement of a user's eyes 904 in the downward direction may indicate that the computing device 902 or user has moved in an upward direction. As previously discussed, the computing device 902 may adjust a frame in any direction to compensate for device or user motion. In this example, the frame may be adjusted in a downward direction based on the motion detected by the camera component 910.

Figure 11:
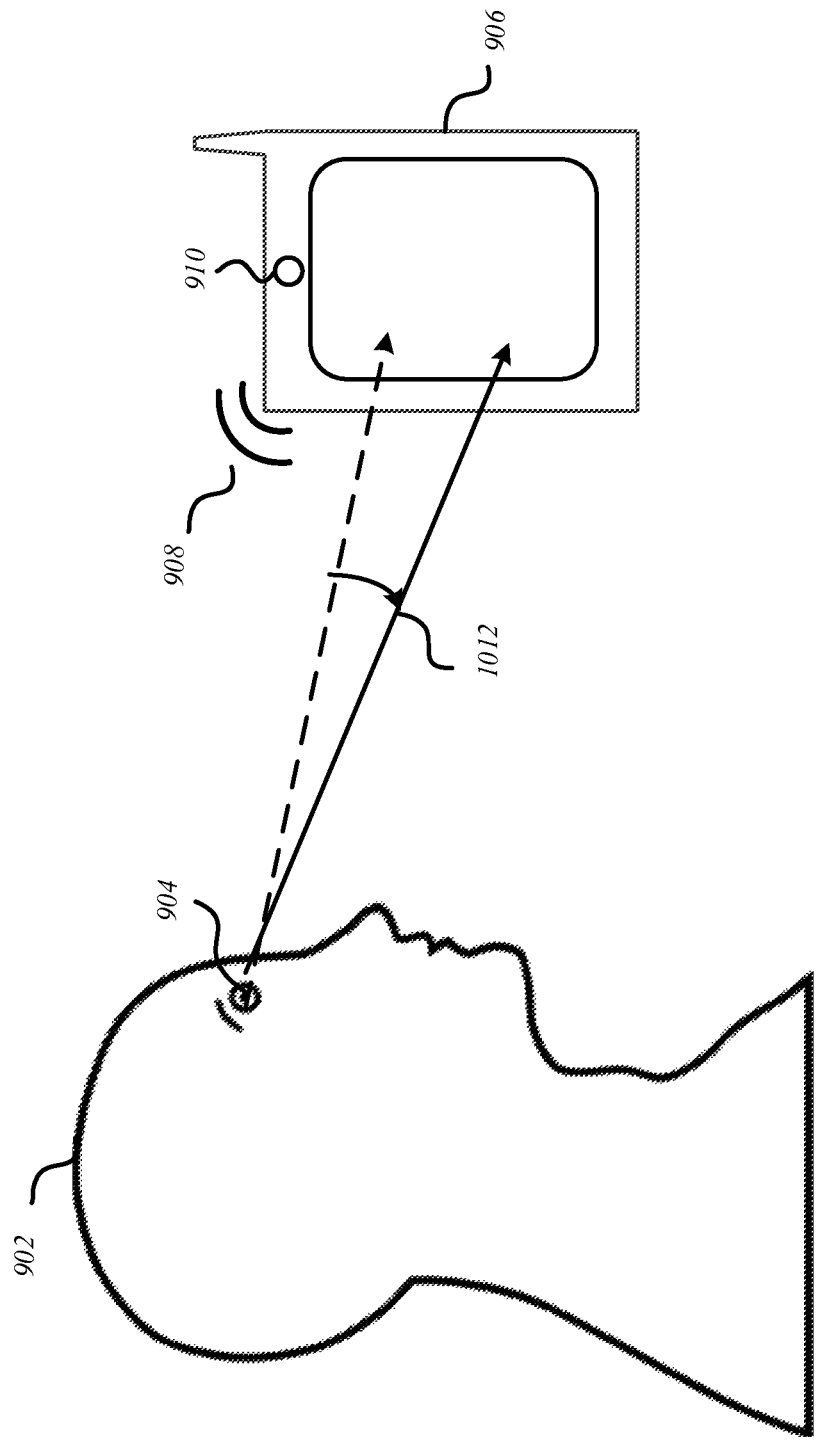
FIG. 11 illustrates an embodiment of a computing device and device and feature motion detection.

FIG. 11 illustrates an embodiment of a computing device 902 detecting both device motion 908 and feature motion 1012. More specifically, the device motion 910 may be detected by a motion sensor component (not shown) and the feature motion 1012 may be detected by a camera component 910. In this exemplary illustrations, the camera component 910 may detect feature motion 1012 in a downward direction based on user's eyes 904 moving focus in a downward direction on a display component of the computing device 902. Further and in this exemplary embodiment, the computing device 902 may be moving in an upward direction and the motion sensor component may detect the upward motion. Various embodiments are not limited to this example, the user's eyes may change focus in any direction and the device may move in any direction.

As previously discussed, one or more frames of video output may be adjusted based on the device motion 908 and the feature motion 1012. In embodiments, the computing device 902 may determine a relative motion between the device motion 908 and the feature motion 1012 to determine the amount of adjustment to apply to the one or more frames. For example, the computing device 902 may apply a larger adjustment when the device motion 908 and the feature motion 1012 are in opposite directions and a smaller adjustment when the device motion 908 and the feature motion 1012 are in the same direction. Further, the adjustment may be a shift or size adjustment made to the frame when displayed on the display component. Various embodiments are not limited in this manner.

Figure 12:
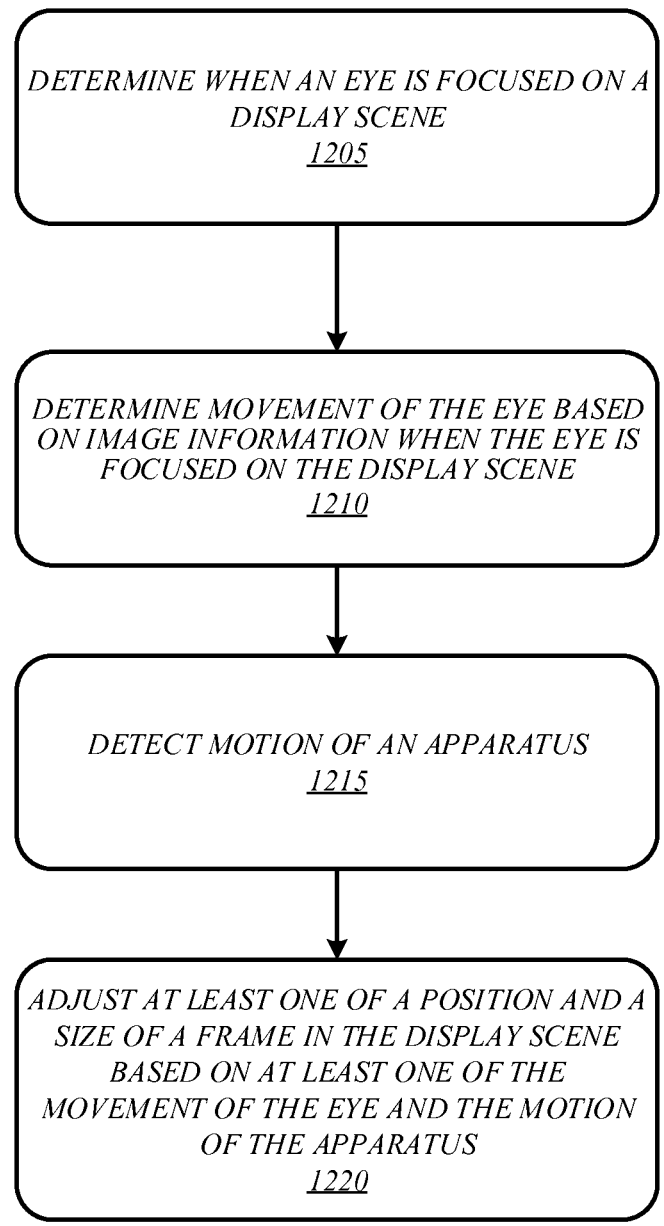
FIG. 12 illustrates an embodiment of a second logic flow for frame stabilization during video output.

FIG. 12 illustrates an exemplary embodiment of logic flow 1200. The logic flow 1200 may be representative of some or all of the operations executed by one or more embodiments described herein. For example, the logic flow 1200 may illustrate operations performed by the system 100, computing device 305 and 1305. In the illustrated embodiment shown in FIG. 12, the logic flow 1200 may include determining when an eye is focused on a display scene at block 1205. More specifically, a computing device may include a camera component to detect image information. Various embodiments may include one or more components to apply one or more image stabilization and feature tracking algorithms to the image information to determine when a user of the device is focused on a display component or display scene within the display component of the device. The various algorithms may be able to determine where a user's eye is focused and may be able to track the user's eye. At certain times a user may not be focused on the display scene and display component, but may be focused away from display scene and display component.

Further, logic flow 1200 may include determining movement of the eye based on image information when the eye is focused on the display scene at block 1210. As previously discussed, one or more algorithms may be able to track the motion of a user's eye. In various embodiments, the user's eyes may move in a upward direction, downward direction, left direction, right direction, or combination thereof. The movement of the user's eyes may indicate that the device, the user or both have moved.

In some embodiments, logic flow 1200 may also include detecting motion of an apparatus at block 1215. As previously discussed the motion of the apparatus or computing device may be determined based on image information received by a camera component and the application or one or more image stabilization algorithms to the image information.

Furthermore, the computing device or apparatus may include a motion sensor component that may also detect motion of the computing device or apparatus based on motion information.

In some embodiments, the motion information may also be used as a motion estimate by the image stabilization and feature tracking algorithms to determine motion of the apparatus or user. By using the motion information from the motion sensor component valuable processing power and cycles may be saved when processing the image information.

The logic flow 1200 may also include adjusting at least one of a position and a size of a frame in the display scene based on at least one of the movement of the eye and the motion of the apparatus at block 1220. In various embodiments the position of the frame may be moved in any direction including an upward direction, a downward direction, a left direction, a right direction, or combination thereof. The direction of the movement of the position may be based on the detected movement of the user's eye, the motion of the apparatus or combination thereof For example, the position of the frame may be moved in the same direction as the movement of the user's eyes and in the opposite direction of the detect motion of the apparatus. Further, the size of the frame may also be adjusted. As similarly discussed above, the size of the frame may be adjusted in any direction and may be in the same direction as the movement of a user's eye or the opposite direction of the motion of the apparatus. Various embodiments are not limited in this manner as apparent by the discussion herein.

Figure 13:
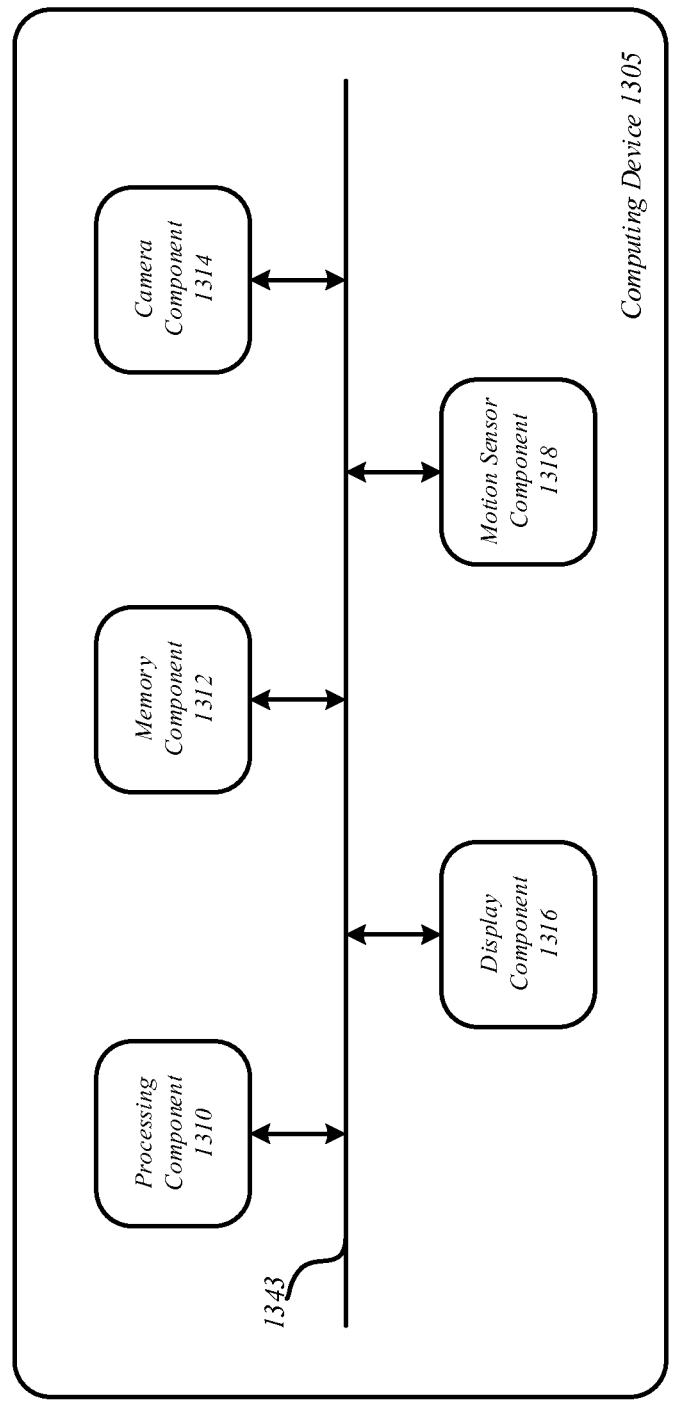
FIG. 13 illustrates an embodiment of a computing device.

FIG. 13 illustrates another embodiment of a computing device 1305 for adjusting a frame of a video output or stream based on detected motion. In various embodiments, computing device 1305 may be the same or similar as computing device 105 illustrated in FIG. 1 and may include the same or similar components. FIG. 13 illustrates computing device 1305 having a processing component 1310, a memory component 1312, a camera component 1314, a display component 1316, and a motion sensor component 1318. The components of computing device 1305 may communicate with each other via one or more interconnects, buses, traces, control lines, data lines and so forth such as interconnect 1343. Further, FIG. 13 illustrates computing device 1305 having a specific number of components, however, various embodiments are not limited in this manner. Computing device 1305 may also include a tracking component and a motion compensation component. These components may be stored in memory, such as memory component 1312, implemented in hardware, or combination thereof. In various embodiments, computing device 1305 may include any number of components for communicating and processing information.

In various embodiments, computing device 1305 may include a processing component 1310. Processing component 1310 may be one or more of any type of computational element, such as but not limited to, processing circuitry including a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing component 1310 may be connected to and communicate with the other elements and components of the computing system via an interconnect 1343, such as one or more buses, control lines, and data lines.

Computing device 1305 may also include a memory component 1312 to couple to processing component 1310. In various embodiments, the memory component 1312 may store data and information for systems, such as system 100 and system 1300. For example, the memory component 1312 may store and maintain information such as image information, motion information and instructions to process the information. Various embodiments are not limited in this manner and memory component 1312 may store and maintain any information for processing.

Memory component 1312 may be coupled to processing component 1310 via interconnect 1343, or by a dedicated communications bus between processing component 1310 and memory component 1312, as desired for a given implementation. Memory component 1312 may be implemented using any machine-readable or computer-readable media capable of storing data, including both volatile and nonvolatile memory. In some embodiments, the machine-readable or computer-readable medium may include a non-transitory medium. The embodiments are not limited in this context.

The memory component 1312 can store instructions and data momentarily, temporarily, or permanently. The memory component 1312 may also store temporary variables or other intermediate information while the processing component 1310 is executing instructions. The memory component 1312 is not limited to storing the above discussed data and may store any type of data.

The computing device 1305 may include a camera component 1314 having circuitry to capture, receive or detect image information. The camera component 1314 may be the same as or similar to camera component 102 of system 100 and may be any type of camera including a still photo camera and/or a video camera capable of capturing the image information. In some embodiments, the camera component 1314 may detect a user's face and facial features, such as a user's eyes, nose, mouth, ears, and so forth and the image information may include facial information. The camera component 1314 may process the image information including the facial information and may send it to the other components of the computing system 1300 for further processing via interconnects 1343.

In embodiments, the computing device 1305 may include a display component 1316. Display component 1316 may constitute any display device capable of displaying information received from processing component 1310 or a graphics processing unit. The display component 1316 may include at least one of a Liquid Crystal Display (LCD), a Thin Film Transistor-LCD (TFT-LCD), an Organic Light Emitting Diode (OLED), a flexible display, a three-dimensional (3D) display, touchscreen and/or touch sensitive display and a projector, for example. The display component 1316 may display a User interface (UI) or a Graphical User Interface (GUI) associated with controlling functionality of the computing device 1305 and one or more frames associated with a video output stream. The computer device 1305 may include two or more display units, according to various embodiments. The display component 1316 may display any information or data associated computing system 1305.

Computing device 1305 may also include a motion sensor component 1318 similar to or the same as motion sensor component 106 of system 100. The motion sensor component 1318 may be any hardware, software and/or logic to detect motion of the computing system 1305. The motion sensor component 1318 may be one or more sensors to detect motion of the computing device 1305 including an accelerometer, a gyroscope, a mercury switch, a micro-pendulum, an inertial sensor, or any other type of sensor to detect motion.

In various embodiments, the motion sensor component 1318 may be used as a standalone component to determine the motion of the computing device 1305 or may be used in conjunction with the camera component 1314 to determine the motion of computing device 1305 and/or a user. The motion sensor component 1318 may detect the motion of the computing device 1305 in any direction in space and may communicate the motion information to other components of computing device 1305.

Figure 14:
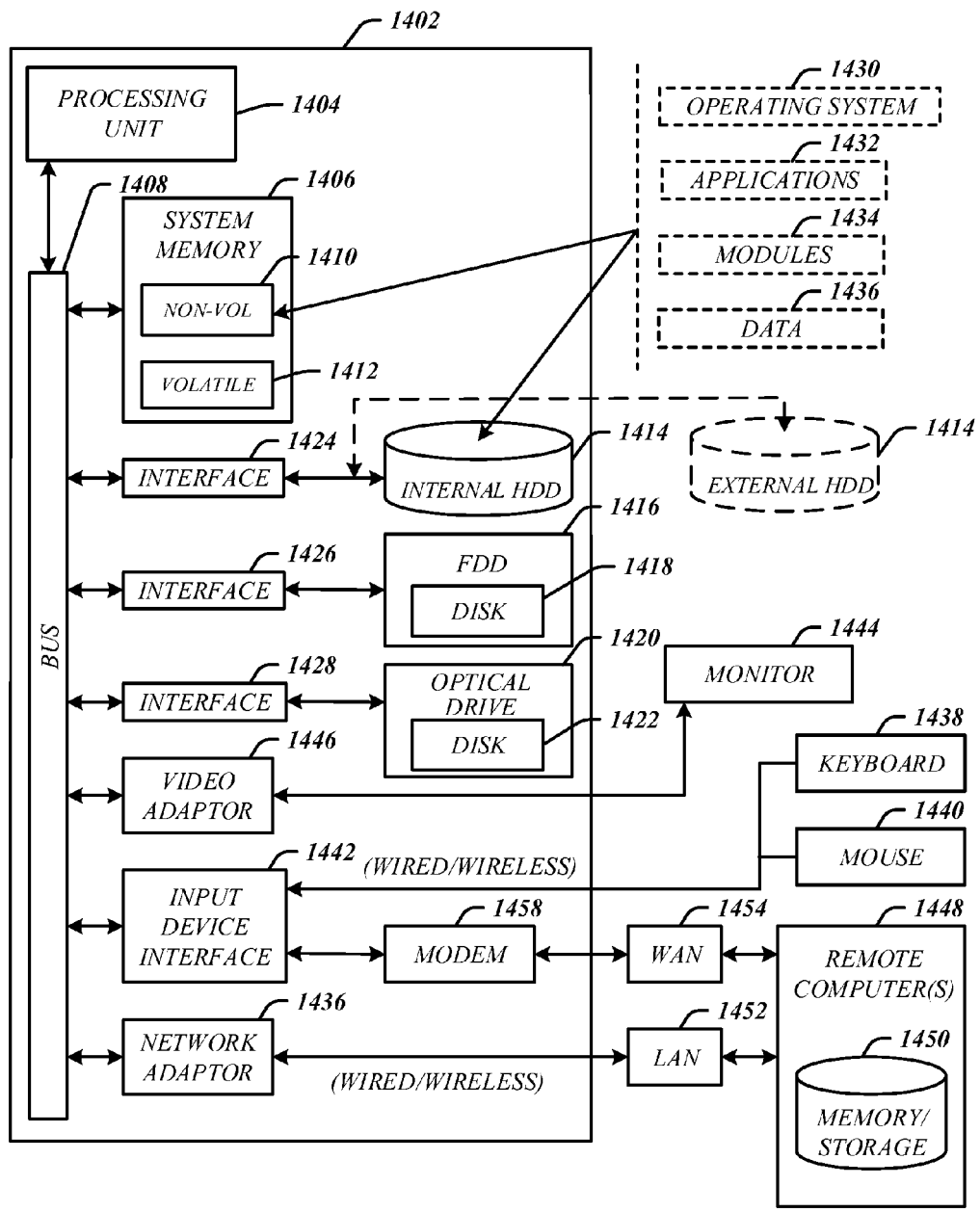
FIG. 14 illustrates an embodiment of a first computing architecture.

FIG. 14 illustrates an embodiment of an exemplary computing architecture 1400 suitable for implementing various embodiments as previously described. In one embodiment, the computing architecture 1400 may comprise or be implemented as part of computing system 100 and computing device 1305.

As used in this application, the terms "system" and "component" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1400.

Figure 6:
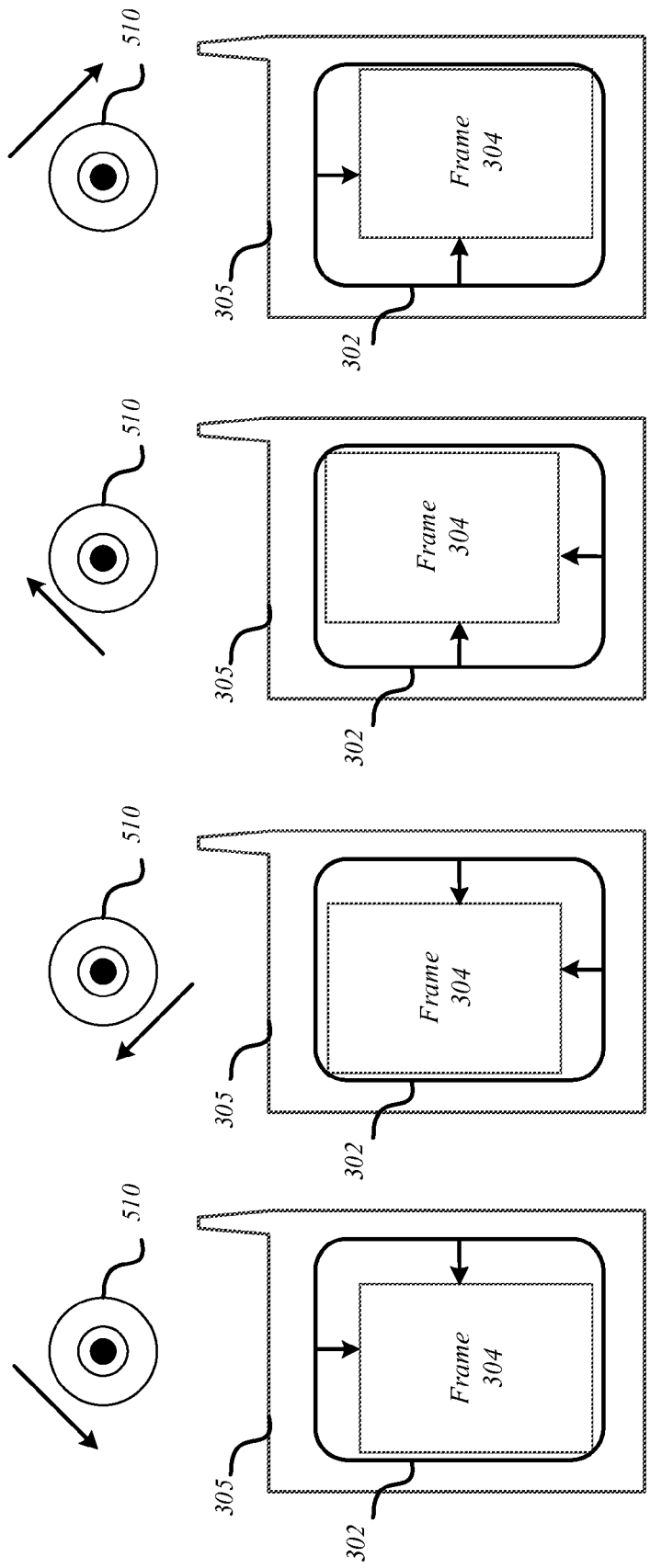
FIGS. 6A-6D illustrate embodiments of a frame adjustment in multiple direction based on feature motion.

As shown in FIG. 6, the computing architecture 1400 comprises a processing unit 1404, a system memory 1406 and a system bus 1408. The processing unit 1404 can be any of various commercially available processors, such as those described with reference to computing device 1305 shown in FIG. 13.

The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus, and a local bus using any of a variety of commercially available bus architectures. Interface adapters may connect to the system bus 1408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1400 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computer 1402 may include various types of computer-readable storage media in the form of one or more lower speed memory units, including an internal (or external) hard disk drive (HDD) 1414, a magnetic floppy disk drive (FDD) 1416 to read from or write to a removable magnetic disk 1418, and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1410, 1412, including an operating system 1430, one or more application programs 1432, other program modules 1434, and program data 1436. In one embodiment, the one or more application programs 1432, other program modules 1434, and program data 1436 can include, for example, the various applications and/or components of the device 102 and device 205.

A user can enter commands and information into the computer 1402 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1404 through an input device interface 1442 that is coupled to the system bus 1408, but can be connected by other interfaces such as a parallel port, IEEE 1394 serial port, a game port, a USB port, an IR interface, and so forth.

A monitor 1444 or other type of display device is also connected to the system bus 1408 via an interface, such as a video adaptor 1446. The monitor 1444 may be internal or external to the computer 1402. In addition to the monitor 1444, a computer typically includes other peripheral output devices, such as speakers, printers, and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computer system 1400 as previously described may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 15:
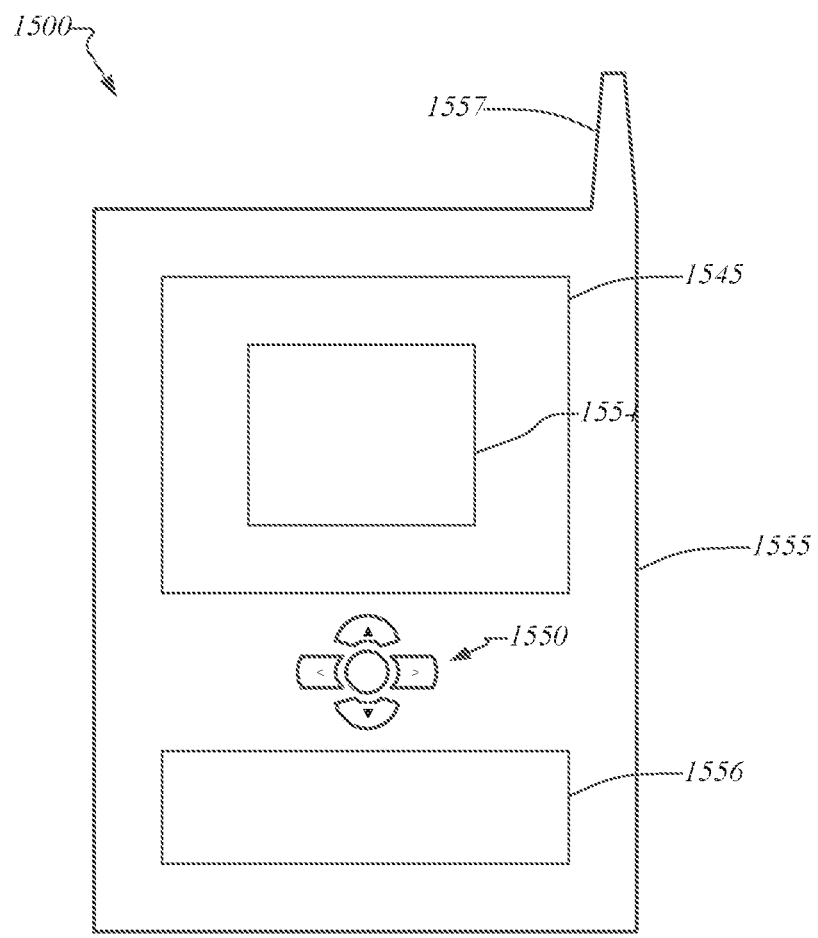
FIG. 15 illustrates an embodiment of a computing device.

FIG. 15 illustrates embodiments of a small form factor device 1500. In embodiments, for example, device 1500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a display 1545, a navigation controller 1550, a user interface 1554, a housing 1555, an I/O device 1556, and an antenna 1557. Display 1545 may include any suitable display unit for displaying information appropriate for a mobile computing device, and may be the same as or similar to display component 110 of FIG. 1. Navigation controller 1550 may include one or more navigation features which may be used to interact with user interface 1554. I/O device 1556 may include any suitable I/O device for entering information into a mobile computing device. Examples for I/O device 1556 may include an alphanumeric keyboard, a numeric keypad, a touch pad, input keys, buttons, switches, rocker switches, microphones, speakers, voice recognition device and software, and so forth. Information also may be entered into device 1500 by way of microphone. Such information may be digitized by a voice recognition device. The embodiments are not limited in this context.

The detailed disclosure now turns to providing examples that pertain to further embodiments. Examples one through thirty-three (1-33) provided below are intended to be exemplary and non-limiting.

In a first example, a system, device, apparatus may include an tracking component to determine when an eye is focused on a display scene and to determine motion of the eye based on image information, one or more motion sensor components to detect motion of the apparatus based on motion information and a compensation component to adjust at least one of a position and a size of a frame in the display scene based on at least one of the motion of the eye and the motion of the apparatus.

In a second example and in furtherance of the first example, the system, device, or apparatus may include a tracking component to use the motion information based on the detected motion of the apparatus when determining the motion of the eye, the motion information to be used as a motion estimate when calculating the motion of the eye.

In a third example and in furtherance of any of the previous examples, the system, device, or apparatus may include a compensation component to adjust at least one of a height or a width of the frame when adjusting the size and to shift the frame in at least one of a horizontal direction or a vertical direction when adjusting the position of the frame.

In a fourth example and in furtherance of any of the previous examples, system, device or apparatus may include a compensation component to a adjust the height from a top edge of the frame when the movement of the eye is in a downward direction, when the motion of the apparatus is in an upward direction, or both, adjust the height from a bottom edge of the frame when the movement of the eye is in a upward direction, when the motion of the apparatus is in a downward direction, or both, adjust the width from a left edge of the frame when the movement of the eye is in a right direction, when the motion of the apparatus is in an left direction, or both and adjust the width from a right edge of the frame when the movement of the eye is in a left direction, when the motion of the apparatus is in a right direction, or both.

In a fifth example and in furtherance of any of the previous examples, the system, device or apparatus may include a compensation component to shift the frame in a same direction as the motion of the eye when adjusting the position.

In a sixth example and in furtherance of any of the previous examples, the system, device apparatus may include a compensation component to shift the frame in an opposite direction of the motion of the apparatus when adjusting the position.

In a seventh example and in furtherance of any of the previous examples, the system, device or apparatus may include a compensation component to communicate a black frame to a display component for presentation when the focus of the eye is not on the display scene.

In an eighth example and in furtherance of any of the previous examples, the system, device or apparatus may include a compensation component to adjust at least one of a position and a size of the frame based only on the determined motion of the eye when no motion of the apparatus is detected and based only on the motion of the apparatus when no motion of the eye occurs.

In a ninth example and in furtherance of any of the previous examples, the system, device, or apparatus may include a camera component to detect the image information and a display component to present the frame in the display scene as part of a video stream on a display device.

In a tenth example and in furtherance of any of the previous examples, the system, device or apparatus may include a display component to present the frame as part of the video stream at a 120 Hz refresh rate.

In an eleventh example and in furtherance of any of the previous examples, at least one computer-readable storage medium comprising a plurality of instructions that when executed enable processing circuitry to determine when an eye is focused on a display scene, detect movement of the eye based on image information when the eye is focused on the display scene, detect motion of an apparatus based on motion information and adjust at least one of a position and a size of a frame in the display scene based on at least one of the movement of the eye and the motion of the apparatus.

In a twelfth example and in furtherance of any of the previous examples, at least one computer-readable storage medium may include a plurality of instructions that when executed enable processing circuitry to use the motion information when detecting the movement of the eye, the motion information to be used as a motion estimate when calculating the movement In a thirteenth example and in furtherance of any of the previous examples, at least one computer-readable storage medium may include a plurality of instructions that when executed enable processing circuitry to adjust at least one of a height or a width of the frame when adjusting the size and shift the frame in at least one of a horizontal direction or a vertical direction when adjusting the position of the frame.

In a fourteenth example and in furtherance of any of the previous examples, at least one computer-readable storage medium may include a plurality of instructions that when executed enable processing circuitry to adjust the height from a top edge of the frame when the movement of the eye is in a downward direction, when the motion of the apparatus is in an upward direction, or both, adjust the height from a bottom edge of the frame when the movement of the eye is in a upward direction, when the motion of the apparatus is in a downward direction, or both, adjust the width from a left edge of the frame when the movement of the eye is in a right direction, when the motion of the apparatus is in an left direction, or both and adjust the width from a right edge of the frame when the movement of the eye is in a left direction, when the motion of the apparatus is in a right direction, or both.

In a fifteenth example and in furtherance of any of the previous examples, at least one computer-readable storage medium may include a plurality of instructions that when executed enable processing circuitry to shift the frame in a same direction as the movement of the eye when adjusting the position.

In a sixteenth example and in furtherance of any of the previous examples, at least one computer-readable storage medium may include a plurality of instructions that when executed enable processing circuitry to shift the frame in an opposite direction of the motion of the apparatus when adjusting the position.

In a seventeenth example and in furtherance of any of the previous examples, at least one computer-readable storage medium may include a plurality of instructions that when executed enable processing circuitry to communicate a black frame to a display component for presentation when the focus of the eye is not on the display scene.

In an eighteenth example and in furtherance of any of the previous examples, at least one computer-readable storage medium may include a plurality of instructions that when executed enable processing circuitry to adjust at least one of a position and a size of the frame based only on the tracked movement of the eye when no motion is detected and based only on the motion of the apparatus when no tracking of the eye occurs.

In a nineteenth example and in furtherance of any of the previous examples, a method may include determining when an eye is focused on a display scene, determining movement of the eye based on image information when the eye is focused on the display scene, detecting motion of an apparatus based on motion information and adjusting at least one of a position and a size of a frame in the display scene based on at least one of the movement of the eye and the motion of the apparatus.

In a twentieth example and in furtherance of any of the previous examples, a method may include using the motion information when determining the movement of the eye, the motion information to be used as a motion estimate when calculating the movement.

In a twenty-first example and in furtherance of any of the previous examples, a method may include adjusting at least one of a height or a width of the frame when adjusting the size, and shifting the frame in at least one of a horizontal direction or a vertical direction when adjusting the position of the frame.

In a twenty-second example and in furtherance of any of the previous examples, a method may include adjusting the height from a top edge of the frame when the movement of the eye is in a downward direction, when the motion of the apparatus is in an upward direction, or both, adjusting the height from a bottom edge of the frame when the movement of the eye is in a upward direction, when the motion of the apparatus is in a downward direction, or both, adjusting the width from a left edge of the frame when the movement of the eye is in a right direction, when the motion of the apparatus is in an left direction, or both and adjusting the width from a right edge of the frame when the movement of the eye is in a left direction, when the motion of the apparatus is in a right direction, or both.

In a twenty-third example and in furtherance of any of the previous examples, a method may include shifting the frame in a same direction as the movement of the eye when adjusting the position.

In a twenty-fourth example and in furtherance of any of the previous examples, a method may include shifting the frame in an opposite direction of the motion of the apparatus when adjusting the position.

In a twenty-fifth example and in furtherance of any of the previous examples, a method may include adjusting at least one of a position and a size of the frame based only on the tracked movement of the eye when no motion is detected and based only on the motion of the apparatus when no tracking of the eye occurs.

In a twenty-sixth example and in furtherance of any of the previous examples, an apparatus may include means for determining when an eye is focused on a display scene, means for detecting movement of the eye based on image information when the eye is focused on the display scene, means for detecting motion of an apparatus based on motion information and means for adjusting at least one of a position and a size of a frame in the display scene based on at least one of the movement of the eye and the motion of the apparatus.

In a twenty-seventh example and in furtherance of any of the previous examples, an apparatus may include means for using the motion information when detecting the movement of the eye, the motion information to be used as a motion estimate when calculating the movement.

In a twenty-eighth example and in furtherance of any of the previous examples, an apparatus may include means for adjusting at least one of a height or a width of the frame when adjusting the size and means for shifting the frame in at least one of a horizontal direction or a vertical direction when adjusting the position of the frame.

In a twenty-ninth example and in furtherance of any of the previous examples, an apparatus may include means for adjusting the height from a top edge of the frame when the movement of the eye is in a downward direction, when the motion of the apparatus is in an upward direction, or both, means for adjusting the height from a bottom edge of the frame when the movement of the eye is in a upward direction, when the motion of the apparatus is in a downward direction, or both, means for adjusting the width from a left edge of the frame when the movement of the eye is in a right direction, when the motion of the apparatus is in an left direction, or both and means for adjusting the width from a right edge of the frame when the movement of the eye is in a left direction, when the motion of the apparatus is in a right direction, or both.

In a thirtieth example and in furtherance of any of the previous examples, an apparatus may include means for shifting the frame in a same direction as the movement of the eye when adjusting the position.

In a thirty-first example and in furtherance of any of the previous examples, an apparatus may include means for shifting the frame in an opposite direction of the motion of the apparatus when adjusting the position.

In a thirty-second example and in furtherance of any of the previous examples, an apparatus may include means for communicating a black frame to a display component for presentation when the focus of the eye is not on the display scene.

In a thirty-third example and in furtherance of any of the previous examples, an apparatus may include means for adjusting at least one of a position and a size of the frame based only on the tracked movement of the eye when no motion is detected and based only on the motion of the apparatus when no tracking of the eye occurs.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   an tracking component to determine when an eye is focused on a display scene and to determine motion of the eye based on image information;
   one or more motion sensor components to detect motion of the apparatus based on motion information; and
   a compensation component to adjust at least one of a position and a size of a frame in the display scene based on at least one of the motion of the eye and the motion of the apparatus, adjustment of the position of the frame to shift the frame in at least one of a horizontal direction or a vertical direction and adjustment of the size of the frame to adjust at least one of a height or a width of the frame, the compensation component to:
   adjust the height from a top edge of the frame when the movement of the eye is in a downward direction, when the motion of the apparatus is in an upward direction, or both;
   adjust the height from a bottom edge of the frame when the movement of the eye is in an upward direction, when the motion of the apparatus is in a downward direction, or both;
   adjust the width from a left edge of the frame when the movement of the eye is in a right direction, when the motion of the apparatus is in an left direction, or both; and
   adjust the width from a right edge of the frame when the movement of the eye is in a left direction, when the motion of the apparatus is in a right direction, or both.

2. The apparatus of claim 1, the tracking component to use the motion information based on the detected motion of the apparatus when determining the motion of the eye, the motion information to be used as a motion estimate when calculating the motion of the eye.

3. The apparatus of claim 1, the compensation component to shift the frame in a same direction as the motion of the eye when adjusting the position.

4. The apparatus of claim 1, the compensation component to shift the frame in an opposite direction of the motion of the apparatus when adjusting the position.

5. The apparatus of claim 1, the compensation component to adjust at least one of the position and the size of the frame based only on the determined motion of the eye when no motion of the apparatus is detected and based only on the motion of the apparatus when no motion of the eye occurs.

6. The apparatus of claim 1, comprising:
   a camera component to detect the image information; and
   a display component to present the frame in the display scene as part of a video stream on a display device.

7. The apparatus of claim 6, the display component to present the frame as part of the video stream at a 120 Hz refresh rate.

8. At least one non-transitory computer-readable storage medium comprising a plurality of instructions that when executed enable processing circuitry to:
   determine when an eye is focused on a display scene;
   detect movement of the eye based on image information when the eye is focused on the display scene;
   detect motion of an apparatus based on motion information; and
   adjust at least one of a position and a size of a frame in the display scene based on at least one of the movement of the eye and the motion of the apparatus, adjustment of the position of the frame to shift the frame in at least one of a horizontal direction or a vertical direction and adjustment of the size of the frame to adjust at least one of a height or width of the frame;

adjust the height from a top edge of the frame when the movement of the eye is in a downward direction, when the motion of the apparatus is in an upward direction, or both;

adjust the height from a bottom edge of the frame when the movement of the eye is in an upward direction, when the motion of the apparatus is in a downward direction, or both;

adjust the width from a left edge of the frame when the movement of the eye is in a right direction, when the motion of the apparatus is in an left direction, or both; and adjust the width from a right edge of the frame when the movement of the eye is in a left direction, when the motion of the apparatus is in a right direction, or both.

9. The at least one non-transitory computer-readable storage medium of claim 8 comprising the plurality of instructions that when executed enable the processing circuitry to use the motion information when detecting the movement of the eye, the motion information to be used as a motion estimate when calculating the movement of the eye.

10. The at least one non-transitory computer-readable storage medium of claim 8 comprising the plurality of instructions that when executed enable the processing circuitry to shift the frame in a same direction as the movement of the eye when adjusting the position.

11. The at least one non-transitory computer-readable storage medium of claim 8 comprising the plurality of instructions that when executed enable the processing circuitry to shift the frame in an opposite direction of the motion of the apparatus when adjusting the position.

12. The at least one non-transitory computer-readable storage medium of claim 8 comprising the plurality of instructions that when executed enable the processing circuitry to adjust at least one of the position and the size of the frame based only on the movement of the eye when no motion is detected and based only on the motion of the apparatus when no movement of the eye is detected.

13. A computer-implemented method, comprising:
determining when an eye is focused on a display scene;
determining movement of the eye based on image information when the eye is focused on the display scene;
detecting motion of an apparatus based on motion information; and
adjusting at least one of a position and a size of a frame in the display scene based on at least one of the movement of the eye and the motion of the apparatus, adjustment of the position of the frame to shift the frame in at least one of a horizontal direction or a vertical direction and adjustment of the size of the frame to adjust at least one of a height or a width of the frame;

adjusting the height from a top edge of the frame when the movement of the eye is in a downward direction, when the motion of the apparatus is in an upward direction, or both;

adjusting the height from a bottom edge of the frame when the movement of the eye is in an upward direction, when the motion of the apparatus is in a downward direction, or both;

adjusting the width from a left edge of the frame when the movement of the eye is in a right direction, when the motion of the apparatus is in an left direction, or both; and adjusting the width from a right edge of the frame when the movement of the eye is in a left direction, when the motion of the apparatus is in a right direction, or both.

14. The computer-implemented method of claim 13, comprising using the motion information when determining the movement of the eye, the motion information to be used as a motion estimate when calculating the movement of the eye.

15. The computer-implemented method of claim 13, comprising:
shifting the frame in a same direction as the movement of the eye when adjusting the position.

16. The computer-implemented method of claim 13 comprising:
shifting the frame in an opposite direction of the motion of the apparatus when adjusting the position.

17. The computer-implemented method of claim 13, comprising:
adjusting at least one of the position and the size of the frame based only on the movement of the eye when no motion is detected and based only on the motion of the apparatus when no movement of the eye is determined.

* * * * *